United States Patent
Goldberg (10) Patent No.: US 8,713,708 B1
(45) Date of Patent: Apr. 29, 2014

(54) METHOD AND APPARATUS FOR CONTROLLING THE USE OF DATA STORED ON A MEDIA SAMPLE

(75) Inventor: Paul R. Goldberg, Palo Alto, CA (US)

(73) Assignee: CSR Technology Inc., Sunnyvale, CA (US)

( * ) Notice: Subject to any disclaimer, the term of this patent is extended or adjusted under 35 U.S.C. 154(b) by 1061 days.

(21) Appl. No.: 12/396,622

(22) Filed: Mar. 3, 2009

Related U.S. Application Data (60) Provisional application No. 61/033,118, filed on Mar. 3, 2008, provisional application No. 61/046,057, filed on Apr. 18, 2008, provisional application No. 61/080,341, filed on Jul. 14, 2008.

(51) Int. Cl.
  *G06F 7/04* (2006.01)
  *G06F 21/80* (2013.01)
  *G06F 21/64* (2013.01)

(52) U.S. Cl.
  CPC ............... *G06F 21/80* (2013.01); *G06F 21/64* (2013.01)
  USPC .................. 726/31; 726/26; 726/27; 726/28; 726/29; 726/30; 726/32; 713/176

(58) Field of Classification Search
  CPC ................................. G06F 21/80; G06F 21/64
  USPC ............ 713/189, 176; 726/2, 326, 34, 26–32; 380/232; 700/121
  See application file for complete search history.

(56) References Cited

U.S. PATENT DOCUMENTS

| | | | |
|---|---|---|---|
| 5,761,301 A * | 6/1998 | Oshima et al. | 705/57 |
| 6,230,270 B1 * | 5/2001 | Laczko, Sr. | 726/34 |
| 6,278,784 B1 | 8/2001 | Ledermann | |
| 6,886,119 B2 | 4/2005 | Vancura | |
| 6,889,305 B2 * | 5/2005 | Adelmann | 711/170 |
| 7,194,364 B1 | 3/2007 | Stanley | |
| 7,210,634 B2 * | 5/2007 | Sapiro | 235/492 |
| 7,260,822 B2 * | 8/2007 | Rijpers et al. | 720/718 |
| 7,346,580 B2 * | 3/2008 | Lisanke et al. | 705/50 |
| 7,484,246 B2 * | 1/2009 | Matsuyama et al. | 726/27 |
| 7,779,058 B2 * | 8/2010 | Shea | 707/705 |
| 7,796,759 B2 * | 9/2010 | Wuidart et al. | 380/265 |
| 7,840,803 B2 * | 11/2010 | Clarke et al. | 713/168 |
| 2001/0033659 A1 * | 10/2001 | Eisenberg | 380/203 |
| 2002/0026602 A1 | 2/2002 | Edelkind | |
| 2003/0046545 A1 | 3/2003 | Merkle, Jr. et al. | |
| 2004/0268451 A1 * | 12/2004 | Robbin et al. | 999/999.999 |
| 2005/0108538 A1 | 5/2005 | Howard et al. | |
| 2005/0181169 A1 | 8/2005 | Bakos et al. | |
| 2005/0276199 A1 * | 12/2005 | Sugai | 369/53.22 |
| 2006/0187719 A1 * | 8/2006 | Matsumoto et al. | 365/189.01 |
| 2007/0232281 A1 * | 10/2007 | Nakai et al. | 455/414.1 |
| 2008/0071617 A1 | 3/2008 | Ware | |

* cited by examiner

*Primary Examiner* — Andrew Nalven
*Assistant Examiner* — Roderick Tolentino
(74) *Attorney, Agent, or Firm* — Lando & Anastasi, LLP (57) ABSTRACT

Techniques for controlling the use of data stored on a media or integrated circuit sample are provided. A sample identifier is created at the point of sample use. The type of sample could range from storage media, such as a Digital Video Disc, or DVD, on which, for example, data representing a motion picture is recorded, to an integrated circuit in which computer code is stored. The sample identifier is stored at a location that is different from where the data is to be employed, and compared with other sample identifiers. The use of the data is controlled based on the results of the comparison.

27 Claims, 6 Drawing Sheets

METHOD AND APPARATUS FOR CONTROLLING THE USE OF DATA STORED ON A MEDIA SAMPLE

RELATED APPLICATIONS

This application claims priority under 35 U.S.C. §119(e) to U.S. Provisional Application Ser. No. 61/033,118, entitled "Method and Apparatus For The Management Of Legacy DVD Copying" filed on Mar. 3, 2008, U.S. Provisional Application Ser. No. 61/046,057, entitled "Method and Apparatus For The Management Of Legacy DVD Copying" filed on Apr. 18, 2008, and U.S. Provisional Application Ser. No. 61/080,341, entitled "Method and Apparatus For The Management Of Legacy DVD Copying" filed on Jul. 14, 2008, each of which is herein incorporated by reference in its entirety.

BACKGROUND OF INVENTION

1. Field of Invention

This invention relates to controlling the copying, transfer and use of digital data and programs stored on media samples, such as Digital Video Discs (DVD), Blu-ray Discs, Compact Discs (CD), Information Versatile Disks for Removable usage (iVDR), flash memory cards, flash memory integrated circuits, mask programmable Read-Only Memory (ROM) integrated circuits, and microcomputer, microcontroller, and Digital Signal Processor (DSP) integrated circuits with built-in non-volatile memory.

2. Discussion of Related Art

The rights holders of copyrighted entertainment content, for example Sony Corporation, through its subsidiaries Sony Pictures Entertainment and Sony Music Entertainment, and Vivendi SA, through its subsidiaries Universal Music Group and Universal Studios, control the use of both movies and music. The rights holders of proprietary processes, such as Dolby Laboratories, and Microsoft Corporation, control the use of proprietary processing technologies. In the case of Dolby, Dolby licenses Dolby Digital audio compression. In the case of Microsoft, Microsoft licenses Windows Media Digital Right Management. All four of these representative organizations are concerned about unauthorized use of their knowledge-based assets. Both entertainment content and proprietary processing technology Intellectual Property (IP) are delivered to end users in electronic form. For entertainment content, storage media samples, such as Digital Video Discs (DVD), Blu-ray Discs, and Micro Secure Digital (microSD) flash memory cards, are often employed to store the digital data that represent the content, and to serve as vehicles for content delivery to end users. In the case of proprietary processes, proprietary process computer code is incorporated into an end user's appliance at the time its manufacture. The code is delivered to the manufacturer as data stored in the Read-Only Memory (ROM) of a programmable Integrated Circuit (IC), such as a Digital Signal Processor (DSP), that is installed into the appliance, or it is loaded into non-volatile memory integrated circuits, installed in the appliance, from storage media. Although various anti-copy approaches are employed to curtail the unauthorized use of both of these types of IP, they have still proven to be at high risk of unapproved redistribution and use. This has led to estimated yearly industry losses of hundreds of millions of dollars. Controlling the after delivery use of IP in digital data form has been, and continues to be, a major activity pursued by these rights holders.

Content rights holders currently employ a number of methods to control the use of their content after distribution. These include data encryption, data marking, data fingerprinting, and distribution media serialization. Due to cost and logistical reasons, individual factory disc serialization, has, for the most part, not been implemented, while encryption, data marking, and data fingerprinting, are only practical for content title identification, not for identification and control of data stored on individual media samples. Note that all of these techniques must be applied at the point of media manufacture. Thus, the use of data on a media sample already in an end user's possession, referred to herein as a "legacy" media sample, cannot be controlled by these approaches.

Figure 1:
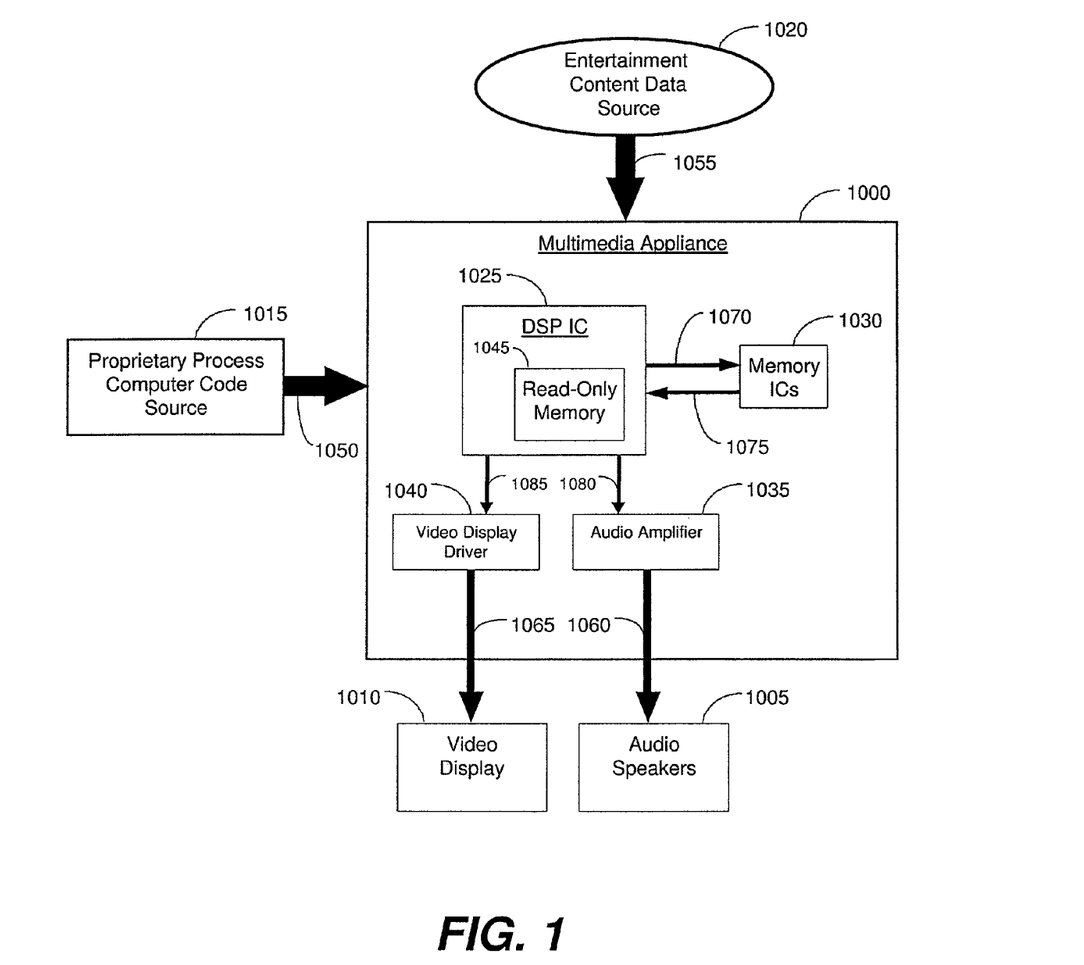
FIG. 1 is a block diagram depicting the incorporation of proprietary processes in a multimedia appliance.

In many cases proprietary processes are used in multimedia appliances to process and display delivered entertainment content data. The content's data is read into the appliance from distribution media, and one or more proprietary processes are often employed to render the content into an Audio/Video (A/V) presentation. The incorporation of such proprietary processes in an appliance is depicted in FIG. 1. Referring to FIG. 1, entertainment content data 1055, stored on physical or network based content data source 1020, is loaded into multimedia appliance 1000. This entertainment content data, which usually takes the form of digital data, is rendered for presentation by use of proprietary process computer code 1050 incorporated into multimedia appliance 1000's DSP embedded Read-Only Memory (ROM) 1045, or programmed into appliance 1000's memory ICs 1030. For DSP 1025, computer code 1050, from code source 1015, is embedded into DSP 1025 at the time of DSP 1025's fabrication. DSP 1025 uses code 1050 to, for example, read content data 1055 from content data source 1020, decrypt the data, decompress the data, separate the audio data from the video data, and convert the A/V data into audio data stream 1080 and video data stream 1085. These two streams are then processed by audio amplifier 1035 and video display driver 1040 so they can property drive audio speakers 1005 and video display 1010 through lines 1060 and 1065, respectively. Code 1050, being programmed into ROM 1045, is installed into appliance 1000 when appliance 1000 is assembled. In the case of memory IC's 1030, proprietary process code 1050 is loaded from code source 1015 into these integrated circuit memory devices, either shortly before memory ICs 1030 are installed into appliance 1000, or shortly after. Irrespective of whether or not code 1050 is stored in the DSP 1025 or in IC memory 1030 external to DSP 1025, the DSP has access to, and can execute, the code. For memory ICs 1030, this access is provided by lines 1070 and 1075. Note that nothing prevents the appliance manufacturer from loading the code into an uncontrolled number of appliances, and nothing prevents DSPs with embedded proprietary code from being sold to unlicensed appliance manufacturers. In either case, the appropriate royalties would not be paid to the proprietary process rights holders.

SUMMARY OF INVENTION

For a media sample carrying entertainment content data, embodiments of the present invention can perform one or more of the following:

(a) allow data on a legacy media sample to be copied once, thus making a single, second generation copy of the media sample's data, with the creation of additional second generation copies of the media sample's data being controlled by the data rights holder;

(b) provide a mechanism to control the transfer of media sample data from a legacy media sample to a portable media appliance, such as an Apple IPod™ or SanDisk Sansa View™, while controlling further use of the transferred data and;

(c) prevent the copying or transfer of data from a rented or borrowed media sample, to another storage media sample, or appliance with internal storage, with the subsequent return of the media sample to the rental outlet or the media sample's owner. This is the so called "rent, rip and return" scenario.

For proprietary code provided to an appliance manufacturer, embodiments of the present invention can perform one or more of the following:

(a) deter a manufacturer from loading licensed proprietary code into an uncontrolled number of appliances; and (b) deter the sale of proprietary code enabled DSPs to appliance manufacturers who are unlicensed by the rights holder of the proprietary process.

To perform one or more of the above aspects, the present invention calls for a sample identifier, either a media sample identifier or an integrated circuit sample identifier, to be created at the point of sample utilization. This sample identifier is processed into a standard form and is subsequently employed to control the use of the data stored on the sample.

According to one aspect of a first embodiment of the present invention, a method of controlling the use of data stored on a media sample is disclosed that comprises creating a media sample identifier at the point of data use using a consumer operable appliance; storing media sample identifiers generated by consumer operable appliances at a location different than the point of data use; storing the media sample identifier; comparing the media sample identifier with one or more second media sample identifiers; and controlling the use of the data in response to the result of the one or more comparisons.

According to a second aspect of a first embodiment of the present invention, an apparatus for creating a media sample identifier within a consumer operable appliance is described that employs a measurement module to measure media sample inherent properties and calculate numerical quantities that are not correlated with data stored on the sample and a processing module to create a media sample identifier from one or more of these numerical quantities.

According to a third aspect of a first embodiment of the present invention, a system for controlling the use of data stored on a media sample is offered. It is composed of a creation module incorporated in a consumer operable appliance to create a media sample identifier from media sample characteristics, the appliance being located at the point of data use; a storage module located at a different location than the point of data use for storing media sample identifiers created by consumer operable appliances; a comparison module for comparing the media sample identifier with one or more second media sample identifiers; and a control module for controlling the use of the data in response to the result of the one or more comparisons.

According to a first aspect of a second embodiment of the present invention, a method of controlling the execution of a process by a programmable processor interconnected with an integrated circuit sample is proffered that calls for creating an integrated circuit sample identifier at the point of integrated circuit sample use by use of integrated circuit sample characteristics; storing the integrated circuit identifier at a location that is different than the point of integrated circuit use; determining if the integrated circuit identifier had been previously stored by comparing the integrated circuit identifier with other stored integrated circuit identifiers created at their points of integrated circuit sample use; controlling the execution of the process by withholding or providing an encrypted version of the process' executable code to the point of integrated sample use in response to the results of the determination; and using the processor and a processor accessible key to decrypt and execute the code.

According to a second aspect of a second embodiment of the present invention, an apparatus for creating an integrated circuit sample identifier is presented whose components are a measurement module to measure integrated circuit inherent properties and calculate numerical quantities that are not correlated with data stored on the integrated circuit sample; and a processing module to create an integrated circuit sample identifier from one or more of these numerical quantities.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE PREFERRED EMBODIMENTS

Figure 2:
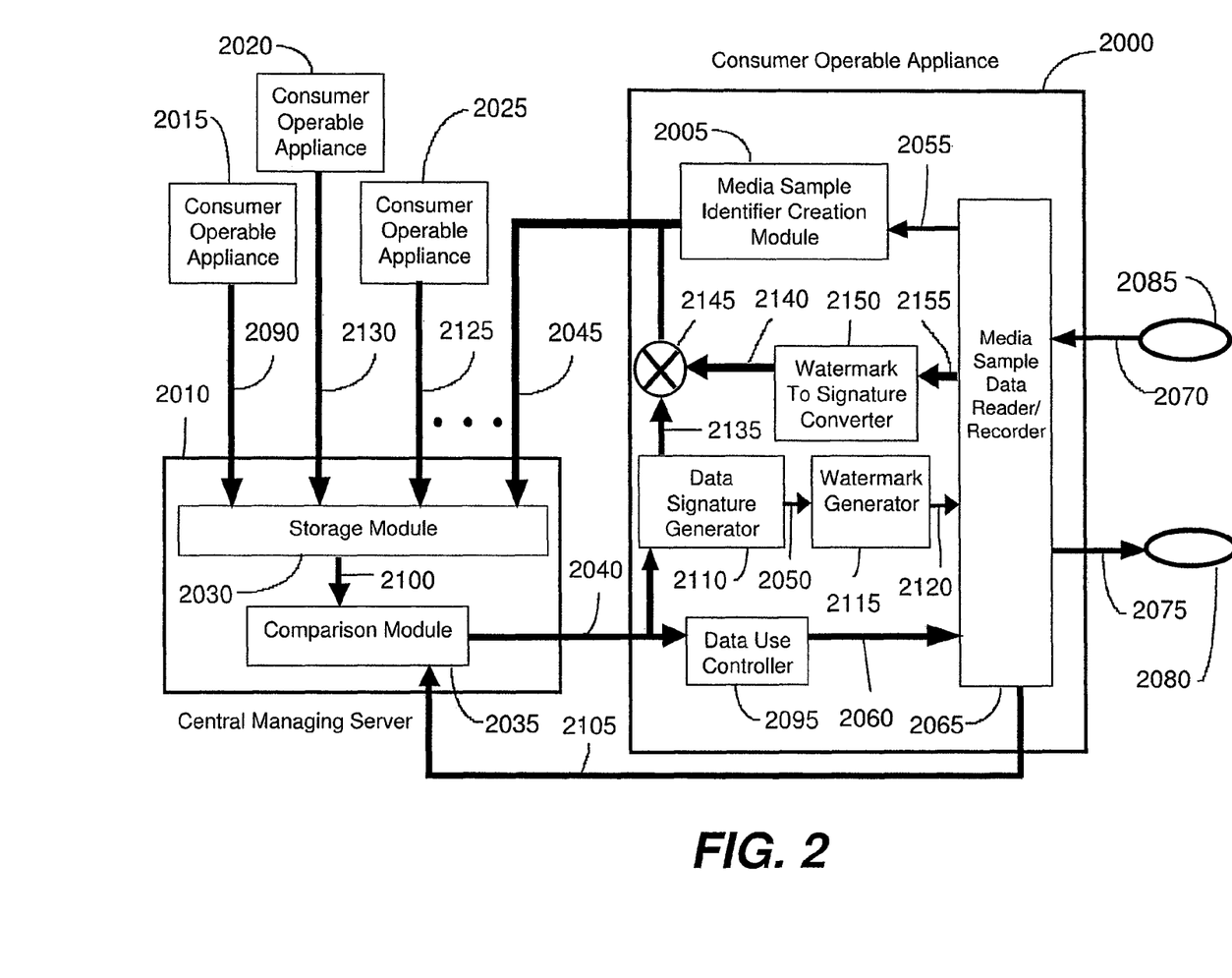
FIG. 2 is a block diagram of a method of controlling the use of data stored on a media sample according to an embodiment of the invention.

FIG. 2 is a block diagram of a method of controlling the use of data stored on a Media Sample according to an embodiment of the present invention. This first embodiment is primarily directed to the after delivery control of copyrighted entertainment content data. As depicted in FIG. 2, Consumer Operable Appliance 2000 includes, Media Sample Data Reader/Recorder 2065, Media Sample Identifier Creation Module 2005, and a Data Use Controller 2095. Additionally, Consumer Operable Appliance 2000 includes Media Sample 2085, when Media Sample 2085 is being read by Media Sample Data Reader/Recorder 2065. By taking advantage of the fact that no two data storing media samples, whether they are in the DVD, CD, or Blu-ray optical disc formats, iVDR magnetic disc format or, microSD flash memory card format, as non-limiting examples, are exactly the same, Media Sample Identifier Creation Module 2005 creates a Media Sample Identifier from measured Media Sample 2085 characteristics, at the point of data use, which can be used to control how the data stored on Media Sample 2085 can be used by the operator of Consumer Operable Appliance 2000.

Although manufactured media samples of the same title version are essentially identical, they do display measurable differences. This is because in the case of replicated optical discs, there are optical and surface irregularities, which result in unique, measurable media characteristics, caused by, for example, disc stamper wear over time, foreign particles on the stamper, differences in injection molding process time, temperature and pressure, non-uniformly applied disc surface protection coatings, non-uniform reflective layer thickness, pin holes in the reflective layer, and disc rotational eccentricity and warp. For flash memory integrated circuit media samples, there are, for example, memory access timing characteristics, and the addresses of faulty bit storage locations, that can be measured.

Media Sample Identifier Creation Module 2005 employs measurement and data processing methods to convert measurements of Media Sample inherent properties to numerical quantities. These numerical quantities, or "Media Sample Characteristics", represent unique properties of Media Sample 2085 that can be used to derive a Media Sample Identifier. Such an identifier can be used to differentiate Media Sample 2085 from all other Media Samples. Referring again to FIG. 2, it can be seen that Media Sample 2085's Media Sample Identifier is communicated to Central Managing Server 2010, over line 2045. Central Managing Server 2010 then stores Media Sample 2085's Identifier in Storage Module 2030. Note that Central Managing Server 2010 is located remotely from Consumer Operable Appliance 2000. Thus, it and Storage Module 2030 are at a location different than the point of Media Sample 2085's data use. Central Managing Server 2010's Comparison Module 2035 then compares Media Sample 2085's identifier with Media Sample Identifiers from other Consumer Operable Appliances, such as Consumer Operable Appliances 2015, 2020, and 2025, communicated to Central Server 2010's Storage Module 2030 over lines 2090, 2130 and 2125 respectively. If this comparison reveals that Media Sample 2085's identifier is not present on the server, it is stored on Storage Module 2030. Data use control information based on the comparison result is then communicated to Consumer Operated Appliance 2000's Data Use Controller 2095 over line 2040. One possible communicated data control directive informs Media Sample Data Reader/Recorder 2065 that it is permitted to make Data Copy 2080 through line 2075 of Media Sample 2085's data. If the Media Sample Identifier communicated over line 2045 is present on the server, as would be the case if the user of Consumer Operable Appliance 2000 attempts to make a second copy of the data stored on Media Sample 2085, Media Sample Data Reader/Recorder 2065 could be commanded by Data Use Controller 2095, through line 2060, not to make a copy of Media Sample 2085's data.

It is important to note that the command directing Media Sample 2085's data not to be copied may be communicated to Consumer Operable Appliance 2000 if the Media Sample Identifier associated with Media Sample 2085 had been previously communicated to Central Server 2010 by any Consumer Operable Appliance enabled by the current invention. Further, such a Consumer Operable Appliance could be located at the point of Media Sample manufacture, the point of Media Sample distribution, the point of Media Sample rental, or the point of Media Sample sale. In fact, the creation and transmission of a Media Sample's Identifier, within and by a Consumer Operable Appliance, can occur any time after media Sample manufacture, and can be initiated by the manufacturer, distributor, rentor, rentee, buyer, or borrower of the Media Sample. Also note that for a conclusive indication that a particular Media Sample Identifier has previously been communicated to Central Server 2010 by a Consumer Operable Appliance, the comparison with a second identifier need not be an exact comparison, or could provide an indication of positive comparison over a range of Media Sample Identifier values.

Once again referring to FIG. 2, Consumer Operable Appliance 2000 further includes Data Signature Generator 2110, connected through line 2050 to Watermark Generator 2115, Watermark Generator 2115 connected through line 2120 to Media Sample Data Reader/Recorder 2065, Data Signature Generator 2110 connected through line 2135, Switch 2145 and line 2045 to Storage Module 2030 of Central Server 2010, and Watermark To Signature Converter 2150, connected through line 2155 to Media Sample Data Reader/Recorder 2065, and through line 2140, Switch 2145 and line 2045, to Storage Module 2030 of Central Server 2010. These components provide for control of data copied from Media Sample 2085 by Media Sample Data Reader/Recorder 2065. This control is accomplished by incorporating within Data Copy 2080 of Media Sample 2085's data, a data signature responsive to the comparison of Media Sample 2085's identifier with other Media Sample Identifiers by Central Server 2010's comparison Module 2030. This data signature identifies the copied data, and provides electronically readable information as to how Data Copy 2080 can be used. One way of incorporating this signature is to embed an electronic watermark, using well known steganographic techniques, into Data Copy 2080. Other data embedding techniques can be employed as well. When using an electronic watermark as the vehicle for data signature embedding, it can be embedded into either the audio or video (or both), portion of the copied data. In FIG. 2, Data Signature Generator 2110 creates the signature in response to the comparison and forwards the signature to watermark generator 2115, where it is converted into a watermark suitable to be sent over line 2120 to Media Sample Data Reader/Recorder 2065 and embedded into Data Copy 2080. The signature is also communicated to Storage Module 2030, through line 2135, Switch 2145 and line 2045, and stored for later comparison with other stored Media Sample signatures. Upon the initiation of further use of Data Copy 2080, for example in Appliance 2000, the watermark embedded into Data Copy 2080 is read by Media Sample Data Reader/Recorder 2065, and through line 2155, connected to Watermark To Signature Converter 2150, where it is converted to Data Copy 2080's signature. Then through line 2140, Switch 2145 and line 2045, Data Copy 2080's signature is sent to Central Server 2030. The signature can then be compared with other stored Data Copy signatures, using Comparison Module 2030, and, depending upon the outcome of the comparison, the use of Data Copy 2080 can be controlled through line 2040 connected to Data Use Controller 2095, or their counterparts in Appliances other than Appliance 2000, should Data Copy 2080's use be initiated in an appliance other than Appliance 2000.

Figure 3:
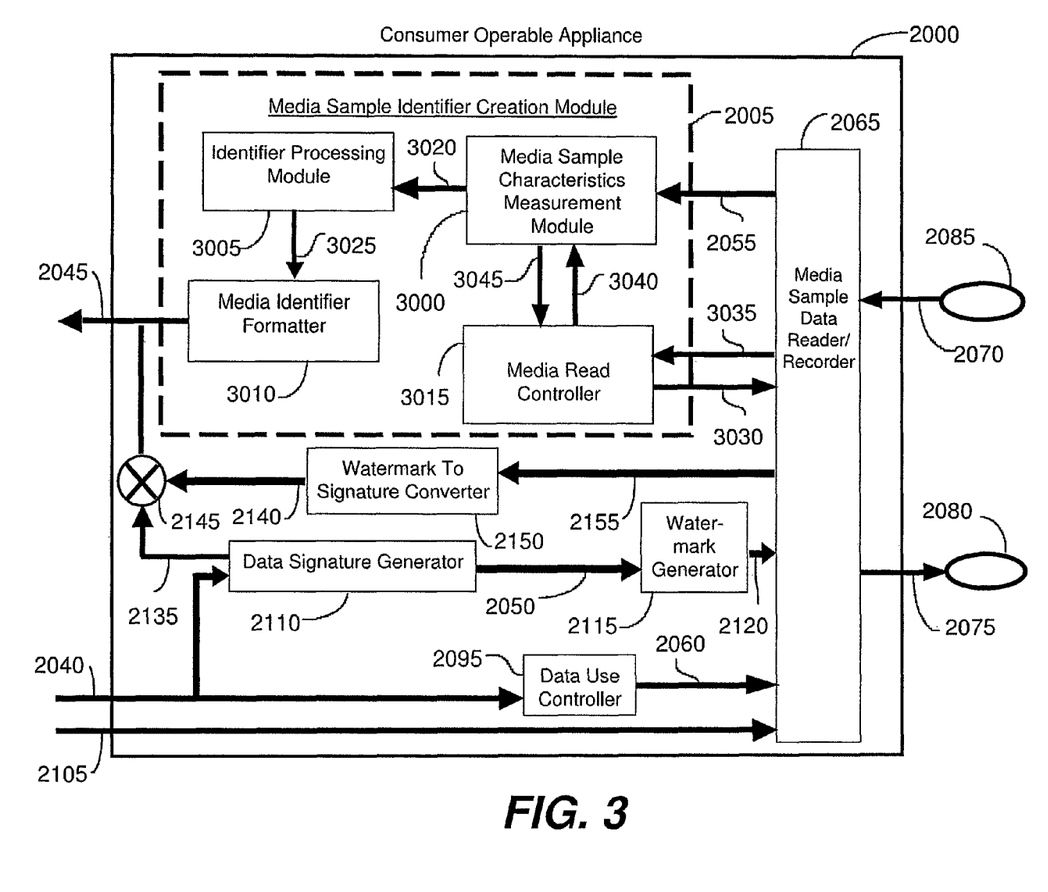
FIG. 3 is a block diagram of an apparatus for creating a media sample identifier within a consumer operable appliance according to an embodiment of the invention.

FIG. 3 illustrates the details of Media Sample Identifier Creation Module 2005, along with surrounding Consumer Operable Appliance 2000 components. Included within Creation Module 2005 is Media Sample Characteristics Measurement Module 3000, Identifier Processing Module 3005, Media Identifier Formatter 3010 and Media Read Controller 3015. Media Sample Characteristics Measurement Module 3000 measures Media Sample 2085's characteristics that are not correlated with data stored on the sample, while Identifier Processing Module 3005 creates Media Sample 2085's Media Sample Identifier from these measurements. For rotating, laser read, optical media, such as DVD, Blu-ray, or CD, disc characteristics can be measured by use of Media Sample Data Reader/Recorder 2065, as directed by Media Read Controller 3015. Assuming that Media Sample 2085 is an optical disc storage media, Controller 3015 causes Data Reader/Recorder 2065's read head, which in this case is a laser optical pick-up head, to scan the whole or part of Media Sample 2085's optical surface, from an inner diameter to an outer diameter, from an outer to an inner diameter or both, as the disc rotates underneath the head. Such scans provide electronic data to Media Sample Characteristics Measurement Module 3000 over line 2055 that represent, for example, regional and small area disc surface reflectivity variations, disc rotational eccentricity, and disc warp, with their respective disc surface locations. From this, data Module 3000 can then measure disc reflectivity variation rise and fall times, disc reflectivity variation shape, disc eccentricity minimum and peak distances, and warp minimum and peak heights. A relative measurement of media sample surface reflectivity can be obtained directly from electrical signals produced by the optical pick-up head's solar cell, as the laser light from the pick-up head impinges on the surface of the optical media and is reflected back onto the solar cell. Optical disc media sample eccentricity, at various disc radial positions, can be measured by counting the number of embossed tracking grooves that pass under the optical pick-up head, as indicated by cyclical solar cell signal fluctuations over one or more disc rotations, while the head is held at multiple radial distances from, for example, the inner diameter of the optical media sample. Knowing the pitch of the grooves (the distance between adjacent grooves), and the number of grooves traversed over one or more disc rotations, can provide a direct measurement of disc eccentricity. While a measurement of optical pick-up head focus variation over one or more disc rotations, indicated by variations in the solar cell's peak output value, can be used to quantify disc warp. These measurements, plus others, along with related location data, can then be used to calculate Media Sample Characteristics that can be forwarded to Identifier Processing Module 3005, to be converted to Media Sample 2085's Media Sample Identifier.

As previously mentioned, if Media Sample 2085 is an optical disc storage media, Controller 3015 can cause Data Reader/Recorder 2065's read head to scan the whole or part of Media Sample 2085's optical surface. The length of the scan, and the disc area covered by the scan, depend upon the scanning speed from a first radial position to a second radial position, the speed of the disc's rotation, and the distance the first and second radial positions are from the inner diameter of the disc. During this scan, the reflected signal level, at, for example, 2500 different, locations along the path of the scan, could be acquired. Many more interrogation positions could be employed, but for this description, 2500 have been chosen for reasons of clarity. Using a constant optical energy illumination from the optical head for this measurement, 2500 different reflected signal measurements may be collected and stored by Media Sample Characteristics Measurement Module 3000. One way of storing these reflected measurements is in the form of a multi-dimensional table of surface reflectivity values, indexed by signal level radial position from Media Sample 2085's inner diameter, and Media Sample 2085's angular position from a predefined angular start position.

Measurement Module 3000 can use these table values to calculate disc reflectivity change rise and fall times, disc reflectivity change shape, disc eccentricity radial distance, and disc warp height. For example, if at radial position 2.54 cm and angular position of 60 degrees, a disc reflectivity change is measured that descends below a predetermined level over an arc of 0.5 seconds, and then regains a value above this level, it could indicate that a pin hole exists in the media's reflective surface at that disc surface location. In the process of creating Media Sample 2085's Media Sample Identifier, this first Media Sample Characteristic can serve as the first numerical input value to Identifier Processing Module 3005. If a disc reflectivity change is cyclical, for example exceeding a predetermined level at an angular position of 15 degrees, peaking at an angular position of 45 degrees, and falling below the level at an angular position of 90 degrees on every disc rotation, starting at a radial position of 3.81 cm and ending at radial position 5.08 cm, this could be indicative of a non-uniform reflective layer thickness caused by a non-uniform aluminum reflective layer sputtering process. This second Media Sample Characteristic can serve as the second numerical input value to Identifier Processing Module 3005. Media eccentricity values at particular radial and angular positions are third Media Sample Characteristics that can serve as third numerical input values to Identifier Processing Module 3005.

In the case of disc warp measurements, a fourth Media Sample Characteristic, average minimum, weighted average minimum, average maximum, and/or weighted average maximum, media sample reflectivity values can be employed. As previously mentioned, an indication of disc warp, that is the vertical distance traveled by the surface of the media sample towards and away from the optical pick-up's lens during each rotation of the media, can be obtained by acquiring values of optical pick-up focus variation over one or more disc rotations. This focus variation is directly related to variations in the solar cell's peak output signal strength. However, since data is recorded on the disc that causes reflectivity value modulation, and the disc surface itself displays numerous imperfections that can also cause reflectivity value modulations, it is necessary to establish the optical head's average minimum and average maximum solar cell signal output, as it relates to a particular media sample, in order to be able to obtain a usable indication of optical pick-up head focus variation. Note that the use of an average minimum value, essentially establishing a stable minimum surface reflectivity, and the use of an average maximum value, essentially establishing a stable maximum surface reflectivity, allows reflectivity values substantially above or below these values to be flagged as reproducible measurements of Media Sample inherent properties that can be converted to the reproducible numerical quantities by Media Sample Characteristics Measurement Module 3000 of FIG. 3. As previously noted, these numerical quantities are the Media Sample Characteristics referred to in this discussion, and are the input to Identifier Processing Module 3005 of FIG. 3, where they can be employed to create Media Sample 2085's Identifier.

It is important to assure that the scanning of a Media Sample reliably produces a Media Sample Identifier that can be associated with a particular Media Sample, such as Media Sample 2085, regardless of the hardware and software characteristics of the scanning Media Sample Data Reader/Recorder. Quite often a Media Sample will be scanned by a Media Sample Reader/Recorder other than the one that transmitted the Media Sample's identifier to a Central Server, such as Central Server 2010. To foster this result, Media Sample Data Reader/Recorder 2065 could employ a non-critically focused (out of focus) optical reader, a scanning pattern which makes certain that the "lanes" traversed by the optical reader head's scanning laser beam overlap, and reflectivity interrogation times that occur at predefined disc angular rotation positions. Using a non-critically focused optical reader, and thus a broader, less defined interrogating laser beam, assures scan lane overlap. It also has the effect of optically low pass filtering acquired, prerecorded data on the disc, by attenuating the variations in disc surface reflectivity due to small, rapidly moving, data features. This facilitates the sensing of surface features that traverse a large number of data features, and allows the position of larger surface features to be reliably sensed. The repeatable surface feature position information thus obtained can then be employed by Media Sample Characteristics Measurement Module 3000 to create a reproducible Media Sample Characteristic.

Still assuming that Media Sample 2085 is an optical disc storage media, Controller 3015 can cause Data Reader/Recorder 2065's read head, to scan the whole or part of Media Sample 2085's optical surface, using an alternate scanning approach than the one previously described. This second scanning approach addresses the challenge of creating reproducible Media Sample Characteristics by using the Media Sample Data Reader/Recorder 2065's optical head in a focused, locked tracking mode, similar to the mode used when playing back a DVD. This allows the reliable acquisition of circumferential, on track, disc surface features that can be converted to reproducible Media Sample Characteristics. This second methodology makes sure that the same areas of the disc are interrogated by different Media Sample Data Reader/Recorders, upon subsequent surface Media Sample Characteristic scans. Since in this mode prerecorded data on disc effects surface reflectivity measurements, reflectivity variations that are manifested as optical reader head solar cell signal modulation need to be attenuated. This can be accomplished by low pass filtering the signal output from the optical head, thus attenuating the variations in disc surface reflectivity due to small, rapidly moving, data features. Media Sample Characteristics can thus be derived from surface features that are equivalent in size to multiple data features. The process of low pass filtering the signals from the optical pick-up head, and only processing signals which are above or below one or more fixed or adaptive predetermined levels, can thus allow the shape and position of these surface features to be reliably ascertained, converted into Media Sample Characteristics, and employed by Identifier Processing Module 3005 to create a robust Media Sample Identifier.

To greatly speed up the time required to completely scan Media Sample 2085's optical surface, either the first or second scanning approach could be configured to limit the number of lanes used to scan Sample 2085's surface. This is easily done in the first approach by changing the speed the optical reader head scans Media Samples 2085's surface from one radial position to a second radial position, since in this approach the optical head is not locked to the pre-embossed grooves on Sample 2085's surface. In the case of the second scanning approach, many circumferential tracks could be skipped between reads, as is done when disc content is read in a "fast forward" search mode. For example, if 40 tracks are skipped between each track read, about 2500 tracks out of the more than 100,000 tracks on the disc would be read. This would allow the entire disc to be interrogated in less that 4 minutes at a 1× disc speed, and in considerably less time at higher disc speeds. In both approaches, measurement samples could also be programmed to occur at a minimum number of predefined disc angular positions. The total number of measurement samples read would be based on the minimum number of samples required to assure that Media Sample 2085's unformatted Media Sample Identifier, created by Identifier Processing Module 3005 and appearing on line 3025 of FIG. 3, could be unique.

When Media Sample 2085 is optical disc storage media, Media Sample Characteristics Measurement Module 3000 can employ numerous measured disc surface feature attributes in order to create a repeatable Media Sample Characteristic. These measurements can be used either independently or in combination to further increase the reliability and repeatability of a Media Sample Characteristic employed by Identifier Processing Module 3005 for the purpose of deriving a reliable Media Sample Identifier. Such disc surface feature attributes include: the rising and falling edge rates and shape of the disc surface feature, the Fourier frequency components of the disc surface feature, the distance of a disc surface feature from prior and post disc surface features, disc position to disc position eccentricity distance, and disc position to disc position disc warp height.

When Media Sample 2085 is not optical disc storage media, Media Sample Characteristics Measurement Module 3000 needs to employs other storage media attributes to calculate repeatable Media Sample Characteristics. Magnetic media, or integrated circuit type media, such as Flash ROM memory, or nonvolatile RAM, represent two broad classes of storage media that are currently available. Many more classes of storage media will be available in the future. Distinctive Media Sample attributes that can be used to calculate repeatable Media Sample Characteristics for these classes of storage media include: number of media defects, the logical addresses of memory defects on the media, average data access times over multiple logical addresses, aggregate access times over multiple logical addresses, minimum access times over multiple logical addresses, and maximum access times over multiple logical addresses.

Identifier Processing Module 3005 receives Media Sample Characteristics from Media Sample Characteristic Measurement Module 3000 over line 3020, and employs these Media Sample Characteristics to create Media Sample 2085's Identifier. As a simple example, assume that over the course of Media Sample 2085 interrogation by Media Sample Characteristic Measurement Module 3000, in combination with Media Read Controller 3015, exactly 100 usable Media Sample Characteristics are acquired. By use of a simple fixed threshold binary comparator, all Media Sample Characteristic numerical values below the threshold could be output as binary "zeros", and all Media Sample Characteristic numerical values above the threshold could be output as binary "ones". Concatenating these binary zeros and ones based on their location on Media Sample 2085, would produce a number whose value would fall into the decimal range of 0 to 1,267,650,600,228,229,401,496,703,205,376. If two Media Sample Characteristics were combined to generate each Media Sample Characteristic, this range would be reduced to 0 to 6338253001141147007483516026288. In either case, sufficient numbers would be available for Identifier Processing Module 3005 to create unique unformatted Media Sample Identifiers on line 3025, for every DVD disc manufactured to date, plus all the DVD discs that will be manufactured for quite some time into the future. It should be noted that given the large amount of data stored on Media Samples of all media storage types, 100 Media Sample Characteristics per Media Sample is a lower limit and not representative of the number of Media Sample Characteristics that could be detected on distributed Media Samples. Thus, the use of two or more Media Sample Characteristics in various ways, for example averaging and weighted averaging, by Identifier Processing Module 3005, to create a Media Sample Identifier, is a practical approach to help assure the creation of a robust Media Sample Identifier that can be employed to reliably control the after delivery use of data stored on a Media Sample.

Media Sample Identifiers on line 3025 are input to Media Identifier Formatter 3010. Formatter 3010 takes unformatted Media Sample Identifiers and converts them into a standardized numbering format. A format such as International Standard Audiovisual Number (ISAN), ISO:15706-1 & 15706-2, could be one such possible standard format. ISAN is a voluntary numbering system for the identification of audiovisual works. It provides a unique, internationally recognized and permanent reference number for each work and their derivatives. A second possible standard numbering format that could be used is the Electronic Product Code (EPC). EPC is a family of coding schemes created as an eventual successor to the bar code. The EPC was created as a low-cost method of tracking goods using Radio Frequency ID (RFID) technology. It is designed to meet the needs of various industries, while guaranteeing uniqueness for all EPC-compliant tags. EPC tags are designed to identify each item manufactured, as opposed to just the manufacturer and class of products, as bar codes do today, so it can accommodate the needs of Media Sample Identifiers. Methods that Media Identifier Formatter 3010 can use to convert unformatted numbers to a standardized number format are well known to those skilled in the art. After the unformatted Media Sample Identifier on line 3025 is formatted by Media Identifier Formatter 3010 into a standard numbering format, it can be sent over line 2045 to Central Server 2010 (See FIG. 2) and stored in Storage Module 2030.

Figure 4:
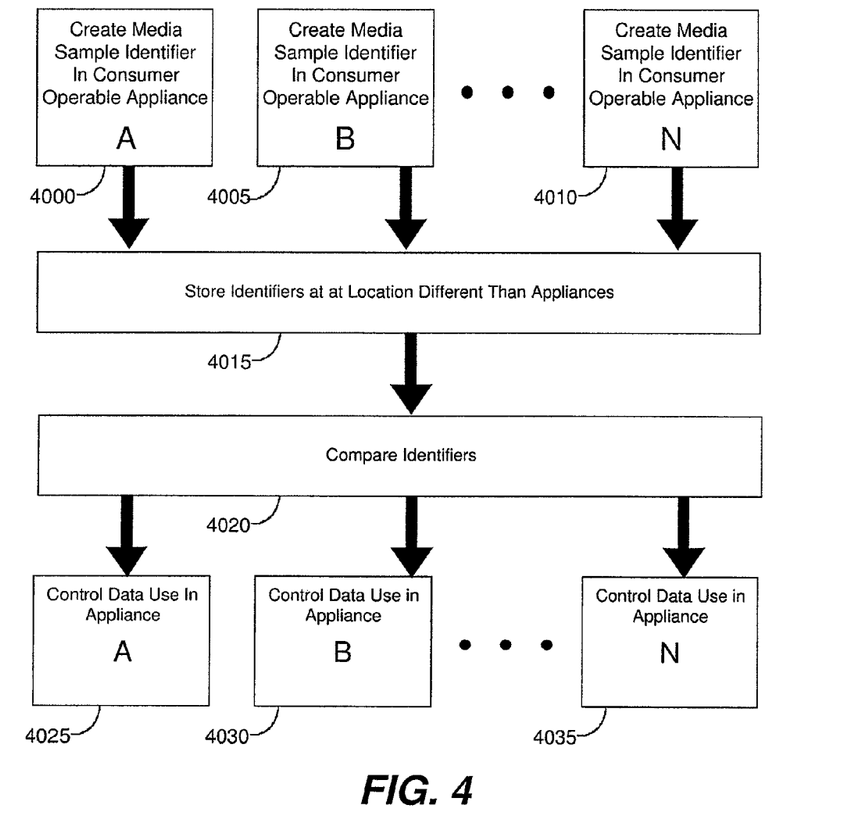
FIG. 4 is a block diagram of a system for controlling the use of data stored on a media sample according to an embodiment of the invention.

FIG. 4 depicts a block diagram of a system for controlling the use of data stored on a Media Sample according to an embodiment of aspects of the present invention. Blocks 4000, 4005 and 4010 represent the creation of Media Sample Identifiers, such as those created by Media Sample Identifier Creation Module 2005 in FIG. 2, in multiple Consumer Operable Appliances, such as Consumer Operable Appliances 2000, 2015, 2020, and 2025, also in FIG. 2. Block 4000 is further labeled A, Block 4005 is further labeled B and Block 4010 is further labeled N to indicate that any number of Consumer Operable Appliances can be supported by the system. These Consumer Operable Appliances can be located at the points of Media Sample use, manufacture, distribution, rental, or sale. Created Media Sample Identifiers are then stored at a location different than the locations of the multiple appliances, as shown by Block 4015. The storage employed could be in one Central Server, such as Central Server 2010 in FIG. 2, or more than one Central Server. When multiple, in other words distributed, Central Servers are employed, Central Server intercommunication is required in order to comprehensively compare a particular Media Sample Identifier with all other Media Sample Identifiers on the system. This comparison is indicated by Block 4020 and is performed to determine if a particular Media Sample has been previously registered by the system. Note that this comparison need not be an exact comparison, meaning that the comparison module could provide a range of Media Sample Identifier values that indicate positive comparison with the Media Sample Identifier begin compared, or a positive comparison is indicated, although an exact match between the Media Sample Identifier being compared and another Media Sample Identifier accessible by the Central Server was not found. Allowing the system to respond to inexact matches with other than "no match found" permits the system to be tolerant of minor changes in Media Sample Characteristics over time. In response to the results of the comparison, a control module in the Consumer Operable Appliance that communicated the particular Media Sample Identifier to the Central Server, controls the use of the data stored on the Media Sample whose Media Sample Identifier has been compared. This is indicated in Blocks 4025, 4030 and 4035, which depict the control of data use in Consumer Appliances A through N. This control could take many forms. Allowing a permanent copy of the data, allowing the viewing of a copy of the data for a defined period of time, or allowing the transfer of data to another appliance for mobile viewing, are just a few of the many rights that could or could not be granted.

Figure 5:
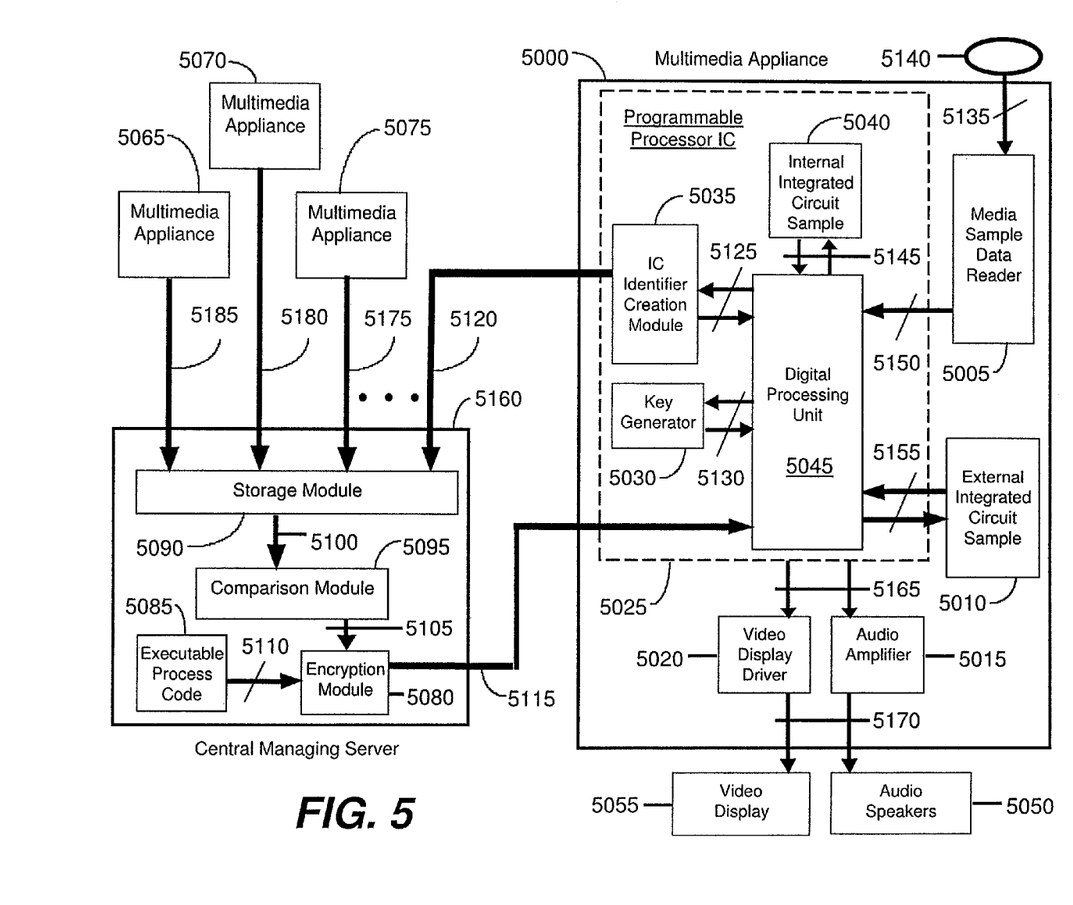
FIG. 5 is a block diagram of a method of controlling the execution of a process by a programmable processor interconnected with an integrated circuit sample according to an embodiment of the invention.

FIG. 5 is a block diagram of a method of controlling the execution of a process by a programmable processor interconnected with an integrated circuit sample according to an embodiment of the present invention. This second embodiment of the present invention is primarily directed to controlling the execution of proprietary code provided to an appliance manufacturer, which has, in the past, been either incorporated into an integrated circuit at the time of the IC's fabrication, or provided to the manufacturer by the use of separate storage media. As depicted in FIG. 5, Multimedia Appliance 5000 includes, Media Sample Data Reader 5005, Media Sample 5140 (when Media Sample 5140 is being read by Media Sample Data Reader 5005), Programmable Processor IC 5025, and External Integrated Circuit Sample 5010 interconnected with IC 5025. Programmable Processor IC 5025 is depicted as being composed of Digital Processing Unit 5045, Internal Integrated Circuit Sample 5040 interconnected with Digital Processing Unit 5045, IC Identifier Creation Module 5035, and Key Generator 5030. When in operation, Multimedia Appliance 5000 reads entertainment content data from Media Sample 5140 and employs Programmable Processor IC 5025 to execute proprietary code that has been either incorporated into Internal Integrated Circuit Sample 5040 by the manufacturer of Programmable Processor IC 5025, incorporated into External Integrated Circuit Sample 5010 by a licensee of the proprietary code, or loaded from Media Sample 5140 into External Integrated Circuit Sample 5010 by Multimedia Appliance 5000's Manufacturer. This code is executed by Programmable Processor IC 5025 in order to decrypt, decode and/or render the entertainment content data read from Media Sample 5140, such that it can be displayed on Video Display 5055 and heard by use of Audio Speakers 5050, as driven by Video Display Driver 5020 and Audio Amplifier 5015, respectively. By taking advantage of the fact that no two data storing Integrated Circuit Samples are exactly the same, IC Identifier Creation Module 5035 creates an Integrated Circuit Sample Identifier from measured Internal IC Sample 5040 characteristics, or an Integrated Circuit Sample Identifier from measured External Integrated Circuit Sample 5010 characteristics, or possibly a combination of both, if both have been incorporated in Multimedia Appliance 5000, at the point of Integrated Circuit Sample use. These IC Sample Identifiers can be used to control the execution of the proprietary code stored.

Although memory IC samples of the same type are essentially identical, they do display measurable differences. IC Identifier Creation Module 5035 employs inherent memory IC media attributes to calculate repeatable IC Sample Characteristics. For IC memory types such as DRAM, SRAM, masked ROM, One Time Programmable ROM, EEPROM, Flash ROM, and nonvolatile RAM, memory IC Sample attributes that can be used to calculate repeatable IC Sample Characteristics include: the number of memory defects, the logical addresses of memory defects on the media, average data access times over multiple logical addresses, aggregate access times over multiple logical addresses, minimum access times over multiple logical addresses, and maximum access times over multiple logical addresses.

IC Identifier Creation Module 5035 employs measurement and data processing methods to convert measurements of IC Sample inherent properties to the numerical quantities being referred to as "IC Sample Characteristics." They represent unique properties of IC Samples 5040 and 5010 that can be used to derive an IC Sample Identifier. Such an identifier can be used to differentiate IC Samples 5040 and 5010, along with the Multimedia appliance they may be incorporated in, from all other IC Samples and appliances. Referring again to FIG. 5, and using External IC Sample 5010 for this example, it can be seen that IC Sample 5010's Media Sample Identifier is communicated to Central Managing Server 5160, over line 5120. Central Managing Server 5160 then stores IC Sample 5010's Identifier in Storage Module 5090. Note that Central Managing Server 5160 is located remotely from Multimedia Appliance 5000. Thus, it and Storage Module 5090 are at a location different than the point of IC Sample 5010's use. Central Managing Server 5160's Comparison Module 5095 then compares IC Sample 5010's identifier with IC Sample Identifiers from other Multimedia Appliances, such as Multimedia Appliances 5065, 5070, and 5075, communicated to Central Server 5160's Storage Module 5090 over lines 5185, 5180 and 5175 respectively. If this comparison reveals that IC Sample 5010's Identifier is not present on the server, it is stored on Storage Module 5090 and Executable Process Code 5085 is transferred over line 5110 to Encryption Module 5080 where it is encrypted to IC Sample 5010's Identifier and provided to Multimedia Appliance 5000's Digital Processing Unit 5045 over line 5115. If the comparison performed by Comparison Module 5095 reveals that IC Sample 5010's identifier is present on the server, encrypted proprietary process code is withheld from Multimedia Appliance 5000, thus preventing the proprietary process code from being provided twice. Once received, Digital Processing Unit 5045 could use IC Sample 5010's Identifier as the key to decrypt and execute the proprietary code.

To minimize the possibility that unencrypted proprietary code could be provided to a second, unlicensed, multimedia appliance, the encrypted proprietary code could be stored on IC Sample 5010 in encrypted form, and only when called upon to process entertainment content stored on Media Sample 5140 would the proprietary code be decrypted and executed by Digital Processing Unit 5045. To further minimize this possibility, IC Sample 5010's Identifier could be converted to the public key part of a public-private key pair by Key Generator 5030, before being sent to Central Managing Server 5160 over line 5120. In this case the private key part of the public-private key pair generated by Key Generator 5030, would be used by Digital Processing Unit 5045 to decrypt the received proprietary code. This approach would allow IC Sample 5010's identifier to be exchanged freely with no concern as to it being employed to decrypt the encrypted version of the proprietary code for unlicensed use. Additional security measures, such as co-locating External IC Sample memory 5010 in the same integrated circuit package as Programmable Processor IC 5025 (in other words using Internal IC Sample memory 5040 instead of External IC Sample memory 5010), creating the public-private key pair from the IC Sample Identifier within the same IC package (such as in the IC package housing Processor IC 5025, IC Sample memory 5040, and Key Generator 5030, as shown in FIG. 5), as opposed to separate IC packages, and making sure that the private key is not accessible outside of Processor IC 5025's package, would significantly reduce the potential of unlicensed use of the proprietary code.

It is important to note that the steps of creating an Integrated Circuit Sample Identifier by use of Integrated Circuit Sample Characteristics, storing the Integrated Circuit Identifier at a location that is different than the point of Integrated Circuit Sample use, and providing an encrypted version of a process' executable code to the point of integrated sample use, are performed after Integrated Circuit Sample 5040 or 5010 of Multimedia Appliance 5000 have been installed into Multimedia Appliance 5000, but can be performed before or after the product has been delivered to a distributor, reseller or buyer. Thus, a multimedia appliance such as Multimedia Appliance 5000, can be delivered to a distributor, reseller or buyer by the manufacturer of the product with or without the licensed proprietary code, often a licensed algorithmic process, necessary to decrypt, decode and/or render entertainment content. This offers rights holders of the licensed proprietary code the option of licensing, and charging fees and/or royalties to any one or more of these 4 entities (the manufacture, distributor, reseller, or buyer) for the use of their intellectual property.

In addition to providing an Integrated Circuit Sample Identifier, derived from Integrated Circuit Sample Characteristics, to Central Server 5160 to be stored on Storage Module 5090, Multimedia Appliance 5000 could also provide an "Entity Identifier." Such and Entity Identifier would indicate the manufacturer, distributor, reseller or buyer of Multimedia Appliance 5000 requesting the encrypted proprietary algorithmic process code. This additional identifier allows the licensor of the proprietary code to determine if the requesting entity is a licensee in good standing of the licensor, and either forward or withhold the licensed algorithmic process code from the entity based on this determination, thus controlling the execution of the process code.

Figure 6:
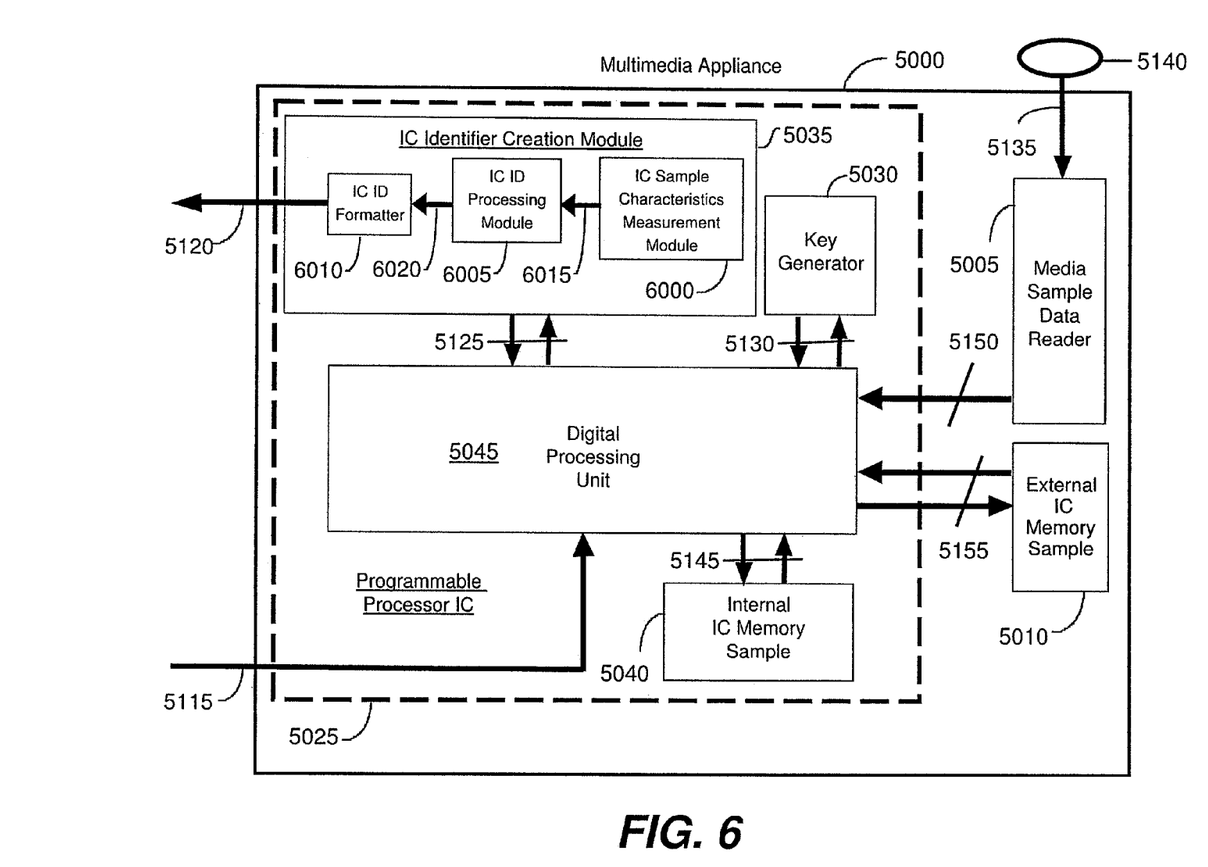
FIG. 6 is a block diagram of an apparatus for creating an integrated circuit sample identifier at the point of sample use according to an embodiment of the invention.

FIG. 6 illustrates the details of IC Identifier Creation Module 5035, along with surrounding Multimedia Appliance 5000 components. Included within Creation Module 5035 is IC Sample Characteristics Measurement Module 6000, IC ID Processing Module 6005, and IC ID Formatter 6010. IC Sample Characteristics Measurement Module 6000 measures Internal IC Memory Sample 5040 and/or External IC Memory Sample 5010 characteristics that are not correlated with data stored on the Integrated Circuit Samples, through the use of Digital Processing Unit 5045, over input/output line pairs 5125 and/or 5155. Identifier Processing Module 6005 creates an IC Sample Identifier from Internal IC Memory Sample 5040 or External IC Memory Sample 5010 Characteristic Measurements, or from Characteristic Measurements from both.

Distinctive IC Sample attributes that can be used to calculate the repeatable numerical quantities being referred to as IC Memory Sample Characteristics in this discussion, for write once memory, such as one time programmable PROM, or rewritable memory, such as Flash ROM and EEPROM that has been loaded with licensed proprietary code and thereafter cannot be written to, include: the number of memory location defects, the logical addresses of memory defects on the IC Sample, and the minimum, maximum, aggregate and average data access times measured over multiple and single logical addresses. For rewritable memory that cannot be preprogrammed, for example DRAM SRAM, minimum, maximum, aggregate and average write cycle times over multiple and single logical addresses could be added to the list. Note that these numerical quantities are not correlated with data stored on the IC Memory Sample and that they are influenced by IC Memory Sample temperature and power supply values. Therefore, refinements to the basic approach of measuring the IC Memory Samples 5140 and 5010 inherent attributes at a single predefined time after Media Appliance 5000 power-up, and converting them into IC Sample Characteristics, may include: scheduling measurements at known intervals after power-up, altering the speed at which these Samples are clocked at known times prior to measurement, writing and/or reading Sample memory locations in one or more predefined patterns of addresses, for predefined times after the nominal temperature of Memory Sample ICs 5040 and 5010 have been reached, and altering the power supply voltages connected to Memory Sample ICs 5040 and 5010 in one or more predefined patterns while making all of these measurements.

IC Identifier Processing Module 6005 receives IC Sample Characteristics from IC Sample Characteristic Measurement Module 6000 over line 6015, and employs these IC Sample Characteristics to create an IC Sample Identifier that can be permanently associated with Multimedia Appliance 6000. As a simple example, assume that over the course of IC Memory Sample 5140 or 5010's or both interrogations by IC Sample Characteristic Measurement Module 6000, in combination with Digital Processing Unit 5045, exactly 200 usable IC Sample Characteristics are acquired. By use of a simple fixed threshold binary comparator, all IC Sample Characteristic numerical values below the threshold could be output as binary "zeros", and all IC Sample Characteristic numerical values above the threshold could be output as binary "ones". Concatenating these binary zeros and ones, based on their logical addresses on the IC Sample or Samples that have been interrogated, would produce a number whose value would fall into the decimal range of: 0 to 1606938044258990275541962092341162602522202993782792835301376. If two IC Memory Sample Characteristics were combined to generate each IC Sample Characteristic, this range would be reduced to: 0 to 803469022129495137770981046170581301261101496891396417650688. In either case, sufficient numbers would be available for Identifier Processing Module 6005 to create unique unformatted IC Sample Identifiers on line 6020, for every IC Memory Sample manufactured to date, plus all the IC Memory Samples that will be manufactured for quite some time into the future. It should be noted that given the large, and increasing, amount of data stored on IC Memory Samples, 200 IC. Sample Characteristics per IC Memory Sample is a lower limit and not representative of the number of IC Sample Characteristics that could be detected on distributed IC Memory Samples. Thus, the use of two or more IC Memory Sample Characteristics in various ways, for example averaging and weighted averaging, by Identifier Processing Module 6005, to create an IC Sample Identifier, is a practical approach to help assure the creation of a robust IC Sample Identifier that can be employed to reliably control the after delivery execution of licensed proprietary algorithmic processes.

IC Sample Identifiers on line 6020 are input to IC ID Formatter 6010. Formatter 6010 takes unformatted IC Sample Identifiers and converts them into a standardized numbering format. One such standardized numbering format that could be used is the Electronic Product Code (EPC). As stated earlier when discussing the first embodiment of the present invention, EPC is a family of coding schemes created as an eventual successor to the bar code. The EPC was created as a low-cost method of tracking goods using Radio Frequency ID (RFID) technology. It is designed to meet the needs of various industries, while guaranteeing uniqueness for all EPC-compliant tags. EPC tags are designed to identify each item manufactured, as opposed to just the manufacturer and class of products, as bar codes do today, so it can accommodate the needs of IC Sample Identifiers. Methods that IC ID Formatter 6010 can use to convert unformatted numbers to a standardized number format are well known to those skilled in the art. After the unformatted IC Sample Identifier on line 6020 is formatted by IC ID Formatter 6010 into a standard numbering format, it can be sent over line 5120 to Central Managing Server 5160 (See FIG. 5) and stored in Storage Module 5090.

Having thus described several aspects of at least two embodiments of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling the use of data stored on a non-transitory media sample, comprising:
    creating a first media sample identifier at the point of data use using a consumer operable appliance, the first media sample identifier uniquely identifying the non-transitory media sample based on measurements of inherent physical, optical, electrical, or magnetic irregularities of the non-transitory media sample that are not correlated with the data stored on the non-transitory media sample;
    sending, via a communication network, the first media sample identifier to a server at a location different than the point of data use;
    storing the first media sample identifier on a computer readable storage module of the server;
    comparing, on the server, the first media sample identifier with one or more second media sample identifiers, the one or more second media sample identifiers having been generated by consumer operable appliances and stored on the computer readable storage module of the server, each respective second media sample identifier of the one or more second media sample identifiers uniquely identifying a respective second non-transitory media sample from which it was created based on measurements of inherent physical, optical, electrical, or magnetic irregularities of the respective second non-transitory media sample that are not correlated with data stored on the respective second non-transitory media sample; and
    sending data use control information to the consumer operable appliance to control the use of the data on the consumer operable appliance in response to the result of the one or more comparisons.

2. The method of claim 1 wherein the first media sample identifier is created at one of:
    the point of non-transitory media sample manufacture;
    the point of non-transitory media sample distribution;
    the point of non-transitory media sample rental; and
    the point of non-transitory media sample sale.

3. The method of claim 1 wherein the first media sample identifier is created after one of:
    the point of non-transitory media sample sale;
    the point of non-transitory media sample rental;
    the point of non-transitory media sample manufacture; and
    the point of non-transitory media sample distribution.

4. The method of claim 1 wherein the comparison of the first media sample identifier with the one or more second media identifiers is not an exact comparison.

5. The method of claim 1 wherein the result of the one or more comparisons is a range of values.

6. The method of claim 1 wherein controlling the use of the data in response to the result of the one or more comparisons includes:
    incorporating within copies of the data a data signature responsive to the result of the one or more comparisons;
    storing the signature on the server;
    comparing the incorporated signature with other stored signatures upon the initiation of use of the copied data in the same or different appliance; and
    controlling the use of the copied data in response to the signature comparison.

7. The method of claim 1 in which the use of the data is the making of one or more copies of the data.

8. The method of claim 1 in which the non-transitory media sample was one of:
  purchased prior to data copy initiation;
  rented prior to data copy initiation; and
  borrowed prior to data copy initiation.

9. A system for controlling the use of data stored on a non-transitory media sample, comprising:
  a creation module incorporated in a consumer operable appliance to create a first media sample identifier from media sample characteristics that are derived from measurements of inherent physical, optical, electrical, or magnetic irregularities of the non-transitory media sample that are not correlated with the data stored on the non-transitory media sample, the consumer operable appliance being located at the point of data use and the first media sample identifier uniquely identifying the non-transitory media sample based on the media sample characteristics;
  a storage module located on a server at a different location than the point of data use for storing one or more second media sample identifiers created by consumer operable appliances each respective second media sample identifier of the one or more second media sample identifiers uniquely identifying a respective second non-transitory media sample from which it was created based on media sample characteristics derived from measurements of inherent physical, optical, electrical, or magnetic irregularities of the respective second non-transitory media sample that are not correlated with data stored on the respective second non-transitory media sample;
  a comparison module located on the server for comparing the first media sample identifier with the one or more second media sample identifiers and generating data use control information based on the one or more comparisons; and
  a control module incorporated in the consumer operable appliance for controlling the use of the data on the consumer operable appliance in response to receipt of the data use control information.

10. The system of claim 9 wherein the consumer operable appliance is located at one of:
  the point of non-transitory media sample manufacture;
  the point of non-transitory media sample distribution;
  the point of non-transitory media sample rental; and
  the point of non-transitory media sample sale.

11. The system of claim 9 wherein the comparison module provides one of:
  an inexact comparison; and
  a range of values.

12. A method of controlling execution of a process by a programmable processor interconnected with a non-transitory integrated circuit sample comprising steps of:
  creating an integrated circuit sample identifier at the point of non-transitory integrated circuit sample use based on sample characteristics of the non-transitory integrated circuit sample that uniquely identify the non-transitory integrated circuit sample, the sample characteristics being derived from measurements of inherent physical or electrical irregularities of the non-transitory integrated circuit sample that are not correlated with data stored on the non-transitory integrated circuit sample;
  storing the integrated circuit sample identifier on a server at a location that is different than the point of integrated circuit sample use;
  determining if the integrated circuit sample identifier had been previously stored on the server by comparing the integrated circuit sample identifier with other stored integrated circuit sample identifiers created at their points of non-transitory integrated circuit sample use, each respective other stored integrated circuit sample identifier uniquely identifying a respective other non-transitory integrated circuit sample based upon other sample characteristics derived from measurements of inherent physical or electrical irregularities of the respective other non-transitory integrated circuit sample that are not correlated with data stored on the respective other non-transitory integrated circuit sample;
  controlling the execution of the process by the programmable processor by providing access to an encrypted version of the process' executable code stored on the non-transitory integrated circuit sample in response to a determination that the integrated circuit sample identifier had not been previously stored on the server; and
  using the programmable processor and a processor accessible key to decrypt and execute the code.

13. The method of claim 12 in which the integrated circuit sample identifier is converted to a public key.

14. The method of claim 12 in which the processor accessible key is a private key.

15. The method of claim 12 in which the integrated circuit sample identifier and the processor accessible key is a public-private key pair.

16. The method of claim 12 in which the programmable processor and non-transitory integrated circuit sample are co-located in the same integrated circuit package.

17. The method of claim 15 in which the public-private key pair is created within an integrated circuit package in which the programmable processor and non-transitory integrated circuit sample are co-located.

18. The method of claim 15 in which the public-private key pair are created outside of an integrated circuit package in which the programmable processor and non-transitory integrated circuit sample are co-located.

19. The method of claim 14 in which the private key is not accessible outside of an integrated circuit package in which the programmable processor and non-transitory integrated circuit sample are co-located.

20. The method of claim 12 further comprising:
  installing the non-transitory integrated circuit sample in a product;
  wherein the steps of creating, storing, determining, controlling, and using are performed after the step of installing.

21. The method of claim 20 further comprising:
  delivering the product to a distributor, reseller or buyer;
  wherein the steps of creating, storing, determining, controlling, using and installing are executed at one of before the step of delivering the product to the distributor, reseller or buyer and after the step of delivering the product to the distributor, reseller or buyer.

22. The method of claim 12 in which integrated circuit sample characteristics are determined by a process executed at one of:
  within the non-transitory integrated circuit sample; and
  outside the non-transitory integrated circuit sample.

23. The method of claim 12 in which the process is a licensed algorithmic process.

24. The method of claim 23 in which an entity identifier is stored in addition to the integrated circuit sample identifier.

25. The method of claim 24 including the step of determining if the requesting entity is a licensee in good standing of the algorithmic process licensor by use of the entity identifier.

26. The method of claim 25 in which the execution of the licensed algorithmic process is controlled in response to the results of the determinations of claim 25 and claim 12.

27. The method of claim 12 in which the non-transitory integrated circuit sample is an integrated circuit memory.

* * * * *